(12) United States Patent
Dürr et al.

(10) Patent No.: US 8,992,144 B2
(45) Date of Patent: Mar. 31, 2015

(54) METHOD FOR PRODUCING CONICAL OR HYPOID WHEELS USING THE PLUNGING PROCESS

(71) Applicant: Klingelnberg AG, Zürich (CH)

(72) Inventors: Alexander Dürr, Saline, MI (US); Wilhelm Kreh, Radevormwald (DE)

(73) Assignee: Klingelnberg AG, Zurich (CH)

( * ) Notice: Subject to any disclaimer, the term of this patent is extended or adjusted under 35 U.S.C. 154(b) by 207 days.

(21) Appl. No.: 13/855,639

(22) Filed: Apr. 2, 2013

(65) Prior Publication Data

US 2013/0259591 A1    Oct. 3, 2013

(30) Foreign Application Priority Data

Apr. 2, 2012 (EP) .................................... 12162874

(51) Int. Cl.
*B23F 9/10*    (2006.01)
(52) U.S. Cl.
CPC .. *B23F 9/10* (2013.01); *B23F 9/105* (2013.01)
USPC .................................. 409/39; 409/51; 409/52
(58) Field of Classification Search
CPC ................ B23F 9/10; B23F 9/12; B23F 9/14; B23F 9/105
USPC .................. 409/38, 39, 50, 51, 52, 53; 407/21
See application file for complete search history.

(56) References Cited

U.S. PATENT DOCUMENTS

| 1,982,036 | A |   | 11/1934 | Wildhaber |
| 2,105,104 | A |   | 1/1938  | Wildhaber et al. |
| 2,310,484 | A |   | 2/1943  | Wildhaber |
| 4,353,671 | A | * | 10/1982 | Kotthaus ......................... 409/26 |
| 4,565,474 | A | * | 1/1986  | Charles .......................... 409/51 |
| 7,156,718 | B2| * | 1/2007  | Blasberg et al. .................. 451/5 |
| 2002/0192004 | A1 | * | 12/2002 | Silverbrook ................. 400/705 |
| 2007/0292224 | A1 | * | 12/2007 | Gumpl et al. .................. 409/26 |

FOREIGN PATENT DOCUMENTS

| EP | 0 850 120 B1 | 5/2002 |
| WO | WO 97/31746 | 9/1997 |

* cited by examiner

*Primary Examiner* — Daniel Howell
*Assistant Examiner* — Michael Vitale
(74) *Attorney, Agent, or Firm* — McCarter & English LLP (57) ABSTRACT

A method of chip-removal machining a tooth gap of a work piece includes executing a first substantially linear plunging movement of the cutting tool along a first plunge vector and machining a region of the work piece near a tooth head of a first tooth flank of the tooth. A substantially transverse movement of the tool along a transverse vector is then executed to machine a region of the work piece near a tooth head of the second tooth flank of the tooth. A second plunging movement of the cutting tool along a vector path is then executed, to an end point of the second plunging movement that lies at a position of the work piece corresponding to the slot depth of the tooth gap to be fabricated. The cutting tool is rotated about an axis of rotation thereof during execution of these steps.

12 Claims, 9 Drawing Sheets

METHOD FOR PRODUCING CONICAL OR HYPOID WHEELS USING THE PLUNGING PROCESS

CROSS-REFERENCE TO RELATED APPLICATIONS

This application claims priority under 35 U.S.C. §119(a)-(d) to European Patent Application No. EP 12 162 874.7, filed Apr. 2, 2012, which is hereby incorporated by reference in its entirety as part of the present disclosure as if fully set forth herein.

FIELD OF THE INVENTION

The present invention relates to methods for producing bevel gears or hypoid gears in a single-indexing plunging process or in the continuous plunging process, in particular using a milling head.

BACKGROUND OF THE INVENTION

Figure 1:
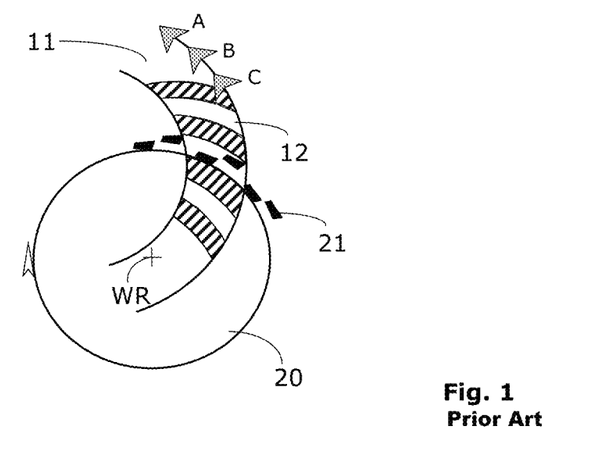
FIG. 1 is a schematic illustration of the known single indexing process.

There are various types of bevel and hypoid gears. For example, circular-arc toothed bevel gears are fabricated in the single indexing process (also called intermitted indexing process, single indexing process or face milling). The single indexing process is shown schematically in FIG. 1. The blades 21 of a cutter head 20 execute a circular movement while one slot of the bevel gear 11 to be produced is fabricated. In order to fabricate further tooth gaps, the cutter head 20 is retracted and the work piece 11 is turned through a pitch angle. The stepwise further turning (here in the anticlockwise direction) is indicated in FIG. 1 by the arrows A, B, C (called indexing rotation). Thus, one tooth gap 22 is always fabricated in one operation.

Epicycloidal, in particular expanded epicycloidal (also called lengthened epicycloidal) toothed bevel gears on the other hand are fabricated by a continuous indexing process (also known as continuous milling, continuous indexing process or face hobbing). In this continuous indexing process both the cutter head and the work piece rotate in a movement sequence matched temporally to one another. The indexing is therefore accomplished continuously and slots and the corresponding teeth are produced quasi simultaneously.

It is known that a ring gear can be produced not only by hob milling but also by plunging (also called insertion). In this case, the tool is advanced into the work piece. A forming process or also of a FORMATE-gearing (FORMATE is a trademark of The Gleason Works, Rochester, N.Y., USA) is discussed. This procedure saves time in the fabrication of the ring gear. As no generating rolling movement takes place, the tool profile is imaged in the ring gear slot. The ring gear thus fabricated then has the profile of the tool, i.e., the profile curvature of the tooth flanks is obtained directly from the tool profile shape of the first tool. The corresponding conjugated bevel gear pinion of a bevel gear pair can then however be manufactured in a modified rolling process, so that the rolled pinion and plunged ring gear can run or mesh correctly with one another. Details on this can be obtained, for example, from the book "Kegelräder; Grundlagen, Anwendungen" (Bevel gears; principles, applications"), by J. Klingelnberg, Springer Verlag, 2008, pages 16-17.

Known from U.S. Pat. No. 1,982,036 is a process for producing a plunged ring gear and a matching rolled pinion, where both bevel gears in this example have tapered teeth. Details of the process mentioned can be deduced from U.S. Pat. Nos. 2,105,104 and 2,310,484. These patents are concerned with the manufacture of arc-teethed or spiral-teethed bevel gears.

During plunging, the tool can be inserted to a predetermined depth in the work piece before the machining removal of material is ended. The plunging is usually accomplished by feeding the tool linearly relative to the work piece, e.g., by a linear movement of a carriage parallel to the tool axis. It is obvious that with increasing plunging, the so-called active cutting length that performs chip-removing machining work increases. This has the consequence that the forces that occur and the loading of the axes of the machine increase. Non-uniform tool and machine loadings can therefore occur during the plunging. In addition, the NC control of the machine is under greater stress because it attempts to compensate for any vibrations that are produced.

The occurrence of non-uniform tool loadings is described, for example, in EP Patent No. 0850120 B1. EP 0850120 B1, however, is primarily concerned with providing a solution that should allow the chip load of the so-called secondary cutting edge of a blade of the tool to be reduced. According to EP 0850120 B1, a special approach for advancing the tool to a predetermined depth in the work piece is described. A feed path that is composed of two vector components is pre-defined. The first vector component runs in the direction of the tool axis, as in conventional plunging and the second vector component runs in the direction of the surface width of the work piece, i.e., along the tooth gap.

It is known from International Patent Application Publication No. WO 97/31746 that a cup-shaped tool can be used for chip-removing machining treatment of a work piece such that the plunging is already beginning while the work piece still executes an indexing rotation. The object of this patent application was to make the process duration shorter.

SUMMARY OF THE INVENTION

The invention is concerned with the milling of bevel gears and hypoid gears. In particular it is concerned with ring gears.

A process is designed for the chip-removing machining of at least one tooth gap of a bevel gear or hypoid gear work piece and comprises the following steps, which are executed in the single indexing process or in the continuous process:

a. rotating a tool having a plurality of cutting edges about a tool axis of rotation during execution of the following indexing steps, b. executing a first relative linear plunging movement along a first plunge vector, that extends substantially perpendicular to the foot cone of the work piece and which defines one end point of the first plunging movement that lies at a position of the work piece that is more than 10 percent of the slot depth of the tooth gap to be fabricated in order to machine with the first main cutting edge primarily a region near the tooth head of a first tooth flank of the tooth gap, c. executing a relative transverse movement along a transverse vector, in order to move the second main cutting edge in the direction of the second tooth flank of the tooth gap and in order to primarily machine a region near the tooth head of the second tooth flank of the tooth gap, d. executing a second relative plunging movement along a vector path, which defines an end point of the second plunging movement that lies at a position of the work piece that approximately corresponds to the slot depth of the tooth gap (31) to be fabricated.

After these indexing steps, re-machining can take place with the same tool in the tooth gap just made by the work piece executing a slight rotation in both directions of rotation. Alternatively, or in conjunction, the tool can be retracted relative to the work piece before an indexing rotation is carried out, for example, in the single indexing process. The tool is set again to fabricate another tooth gap and the steps listed above are executed again. In this continuous process this "additional" rotation of the working gear (in addition to the indexing rotation) has effects on the cutter head rotation via the coupling to the cutter head.

In a single indexing process according to an aspect of the invention, one tooth gap after the other is machined step for step. In a continuous process according to another aspect of the invention, all the tooth gaps are machined together, where the plunging feed in the continuous process is slower than in the single indexing process.

In one embodiment, at least the following indexing steps are executed during fabrication of the tooth gaps of a ring gear. In a first indexing step, at least one blade or cutter of a tool is plunged eccentrically to the tooth gaps to be fabricated a little ways into the material of the ring gear work piece. This takes place along the first straight plunge vector that is substantially perpendicular on the foot cone of the work piece to be machined. In this case, a (linear) region near the tooth head of a first tooth flank of the tooth gaps to be fabricated is already almost completed where the desired dimension is achieved along a line, whereas in the remaining region of the first tooth flank an excess of material remains. In a second step adjoining the first indexing step, the blade or the cutter of the tool is moved in the direction of the second tooth flank of the tooth gap away from the first tooth flank when viewed laterally. This movement takes place along a transverse vector that follows a straight line. In so doing, a region near the tooth head of the second tooth flank of the tooth gaps to be fabricated is almost completed where the desired dimension is achieved along a line, whereas in the remaining region of the second tooth flank an excess of material remains. Now the blade or the cutter is plunged deeper into the tooth gaps to be fabricated until the tooth base is reached and the first and second tooth flanks from the tooth head to the tooth foot are completely finished or almost finished. The third indexing step takes place by a relative movement along a vector path that is composed of one or of two component vectors.

In some embodiments, the movement of the first indexing step is obtained by an NC-controlled linear (carriage) movement of the tool in the direction of the work piece. In some embodiments, the movement of the second indexing step is produced by an NC-controlled superposition of two linear movements. The movement(s) of the third indexing step can be produced by a superposition of three NC-controlled linear (carriage) movements of the tool in the direction of the work piece.

In some embodiments, a cutter head is used as cutting tool, which either has at least one inner cutter and an outer cutter with respectively one main cutting edge (for producing the flank end geometry), an auxiliary cutting edge, and a head cutting edge, or which has at least one full-cutting blade with two main cutting edges and one head cutting edge. In other embodiments, a cutting tool with central or pre-cutters is used The invention can be used particularly advantageous when fabricating ring gears. The invention is quite particularly advantageous for fabricating large-module ring gears.

The plunging method of the invention is implemented in particular using a milling head which has a disk-, plate- or cup-shaped base body which is fitted with (rod) blades or (cutting) teeth.

DETAILED DESCRIPTION OF EMBODIMENTS OF THE INVENTION

In connection with the present description terms are used which are also used in relevant publications and patents. However, it is noted that the use of these terms should merely serve a better understanding. The inventive idea and the scope of protection of the claims should not be restricted in the interpretation by the specific choice of terms. The invention can readily be transferred to other concept systems and/or technical fields. The terms should be used appropriately in other technical fields.

Figures 2A, 2B:
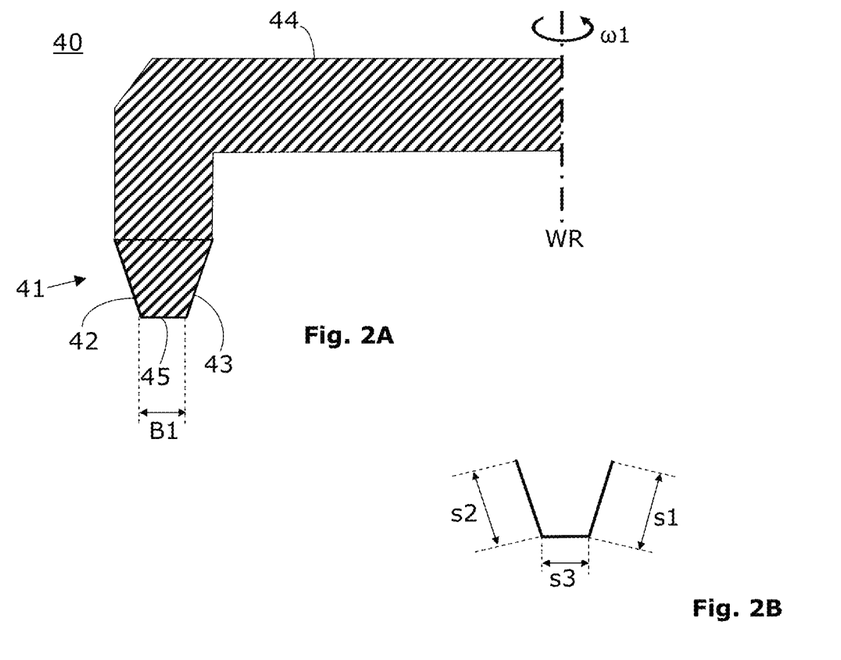
FIG. 2A is a schematic illustration of an axial section of a cutting tool.
FIG. 2B is a schematic illustration of the cutting edge length of the cutting tool of FIG. 2A.

A chip-removing machining process is involved here in which a cutting tool 40 having at least two main cutting edges 42, 43 is used. These main cutting edges 42, 43 can sit on a full-cutting blade of the tool 40, or this can comprise main cutting edges 42, 43 of an inner cutter and an outer cutter of the tool 40. The corresponding blade or cutters 41 of the cutting tool 40 project substantially parallel to the tool axis of rotation WR or obliquely to the axis WR from a surface of the tool 40. FIG. 2A shows an embodiment in which a blade 41 of the tool 40 projects parallel to the tool axis of rotation WR from the disk-, plate- or cup-shaped base body 44.

Studies have shown that perturbing vibrations can occur when executing chip-removing machining. It has been determined that there is a relationship between the occurrence and strength of these vibrations and the so-called active (main) cutting edge length on the tool 40. If a critical active cutting edge length SKL is exceeded during machining, the tendency for the occurrence of vibrations increases significantly. According to one aspect of the invention, a special multistage plunging process was developed in which the relative paths were determined and fixed taking into account the mentioned critical active cutting edge length SKL in order to thus prevent the occurrence of vibrations.

As already mentioned, FIG. 2A shows the axial section of an exemplary and purely schematic tool 40. The tool 40 comprises a base body 44 which is designed to be plate-, disk- or cup-shaped and on which at least one cutter or blade 41 is provided. For simplicity FIGS. 2A and 3A-3C show a blade or cutter 41 having a symmetrical profile. The tool 40 has a tool axis of rotation WR which coincides with an axis of rotation of a tool spindle of a corresponding NC processing machine. The tool 40 here has a cutting edge length SL which is composed of three partial edge lengths s1, s2, s3, as shown in FIG. 2B. It holds that: SL=s1+s2+s3. Since a tool 40 having a symmetrical profile is involved here, in this special case it holds that s1=s2. FIGS. 5 and 6 show tools 40 having an asymmetric profile.

Figures 3A, 3D:
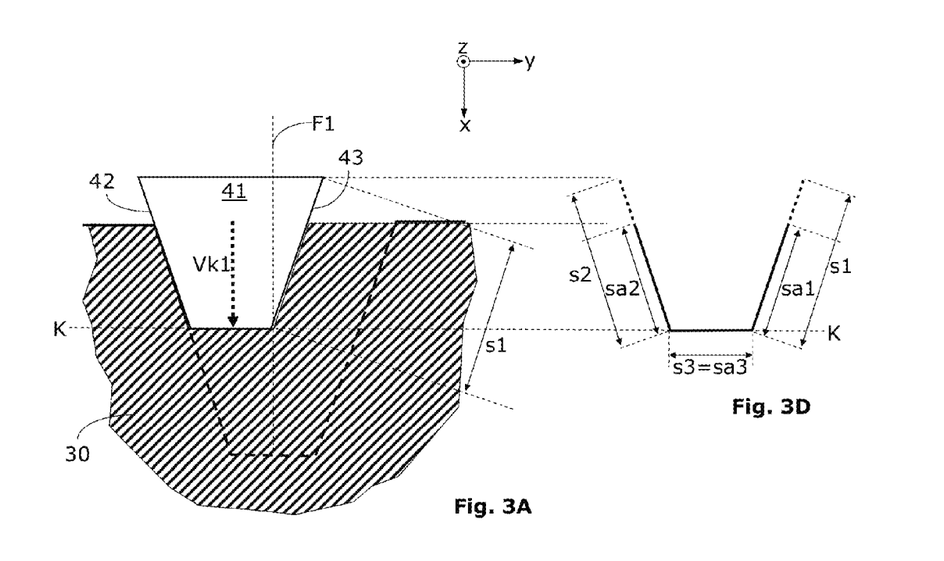
FIG. 3A is a schematic section of a radial plane of a part of a bevel gear work piece showing a first step of the machining process.
FIG. 3D is a schematic illustration of the cutting edge length and the active cutting edge length of the tool from FIG. 3A.
Figures 3B, 3E:
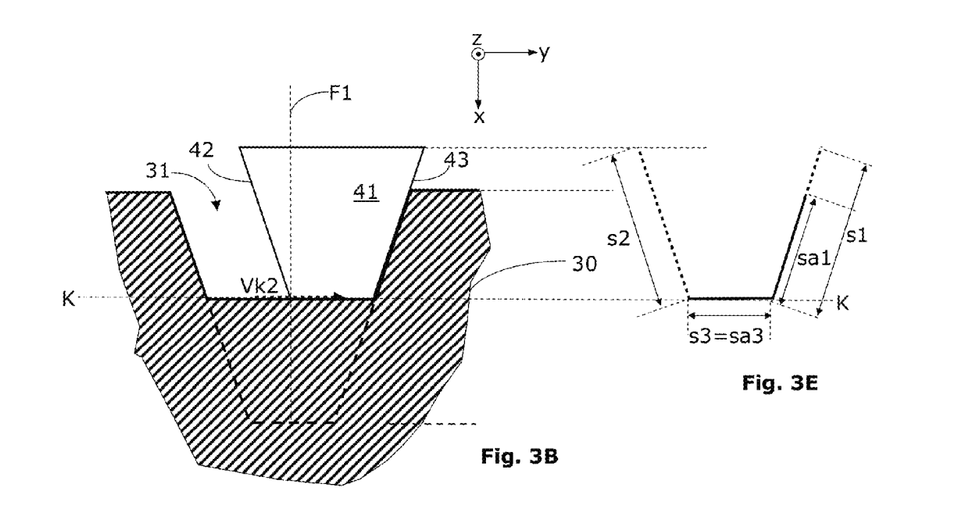
FIG. 3B is a schematic section of the radial plane of the part of the bevel gear work piece of FIG. 3A, showing a second step of machining process.
FIG. 3E is a schematic illustration of the cutting edge length and the active cutting edge length of the tool from FIG. 3B.
Figure 3C:
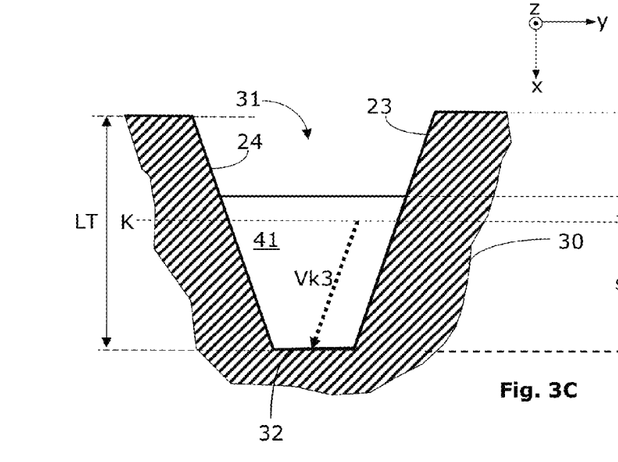
FIG. 3C is a schematic section of the radial plane of the part of the bevel gear work piece from FIG. 3A showing a third step of machining process.

Details of a first process are described with reference to FIGS. 3A to 3G, where FIGS. 3A to 3C show a schematic section in a tangential plane of the gearing to be produced through a small section of a work piece 30. The tangential plane mentioned is defined by the perpendicular of the foot cone which forms the line of intersection F1 of a work piece cone lateral surface with the tangential plane. The work piece cone lateral surface has a cone angle φ which is shown in FIG. 4A.

The actual curvature of the work piece 30 is not shown in these schematic drawings. In addition only one single tooth or one single blade 41 of the tool 40 can be identified. Both the tooth gap 31 to be fabricated and also the tooth or the blade 41 have a symmetrical shape in the example shown.

A process is specially designed for chip-removal machining of at least one tooth gap 31 of a bevel gear or hypoid gear work piece 30 and comprises at least the following steps:

Rotating the tool 40 having at least two main cutting edges 42, 43 about the tool axis of rotation WR during execution of the following indexing steps.

Relative feeding of the tool 40 in relation to the work piece 30 in order to bring at least one of the several main cutting edges 42, 43 of the tool 40 in contact with the work piece 30. This step is not shown in the figures and can be executed in various ways by suitably controlling the NC axis (axes) of the processing machine.

Executing a first relative linear plunging movement along a first plunge vector Vk1 (perpendicular to the foot cone angle δf of the bevel gear or hypoid gear work piece 30 or parallel to the x axis of the coordinate system shown in FIG. 3A), which determines an end point E1 (see FIG. 3G) of the first plunging movement, which lies at a position of the work piece 30 which is more than 10%, and in some embodiments more than 40%, of the slot depth LT of the tooth gap 31 to be fabricated. In FIG. 3A the execution of the first relative linear plunging movement along the first plunge vector Vk1 is indicated by a downwards-pointing dotted arrow. For better illustration of the invention, both in FIG. 3A and in FIG. 3B the outline of the tooth gap 31 to be fabricated is indicated by a dashed line.

Figure 6:
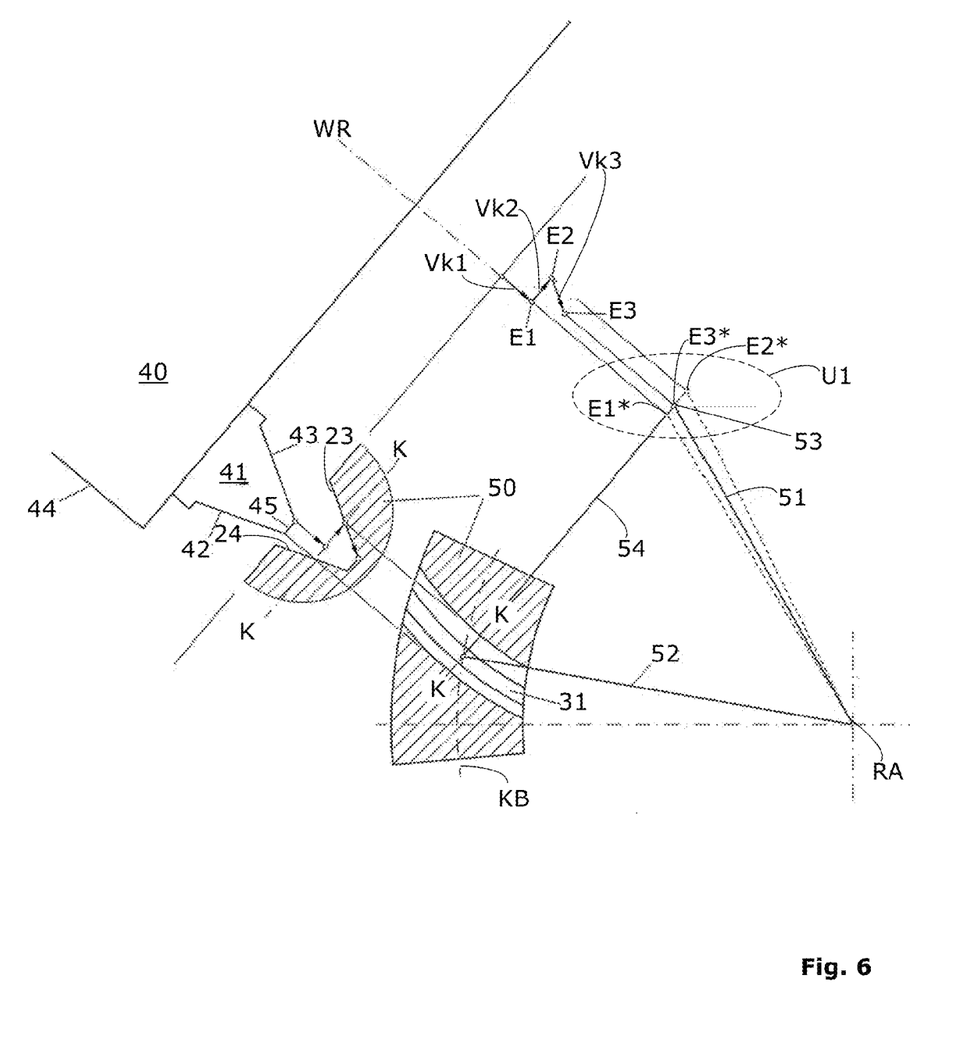
FIG. 6 is a diagram showing (i) a cut through a work piece with a tooth gap to be fabricated (left), (ii) a plan view of the tooth gap to be fabricated (right), and (iii) the corresponding projections of the vectors in an adjacent diagram (top), showing the indexing steps of a simplified process (e.g. by analogy to FIG. 3G)
Figure 7:
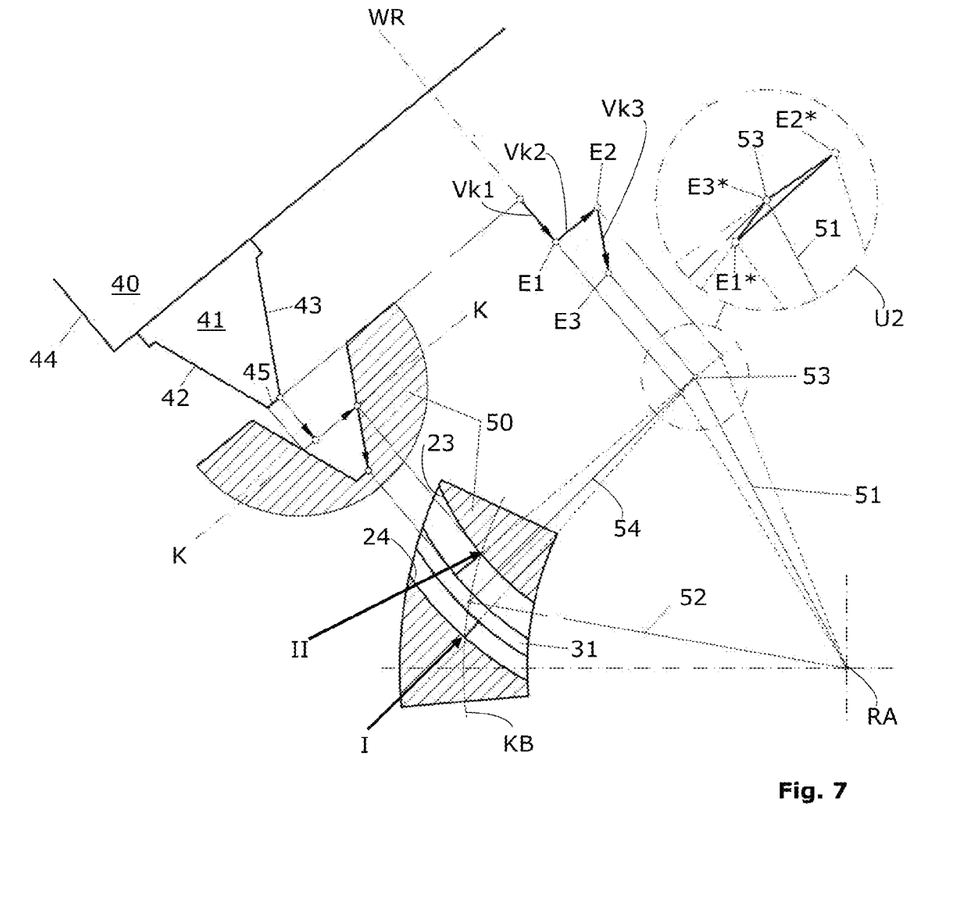
FIG. 7 is a diagram showing (i) a cut through a work piece with a tooth gap to be fabricated (left), (ii) a plan view of the tooth gap to be fabricated (right), and (iii) the corresponding projections of the vectors in an adjacent diagram, showing the indexing steps of an optimized process.

Executing a relative linear transverse movement along a transverse vector Vk2. In FIGS. 5A, 5B, 5C, 6 and 7 it can be seen that the cutter head centre point 53 moves from E1 to E2 and from E2 to E3 on a straight line in each case. The points which are contacted on reaching the end points E1 and E2 on the tooth flanks 23, 24 lie on the same pitch circle radius in FIG. 7. In FIG. 6, on the other hand, the points which are contacted on reaching the end points E1, E2 and E3 on the tooth flanks 23, 24 lie in one plane. The transverse vector Vk2 optimally runs so that the points which are contacted on reaching the end points E1 and E2 on the tooth flanks 23, 24 lie on the same pitch circle radius (the corresponding pitch circle is indicated in FIG. 7 by a circular arc KB and the corresponding pitch circle radius is designated by the reference number 52). The second indexing step is shown schematically in FIG. 3B.

Figure 3F:
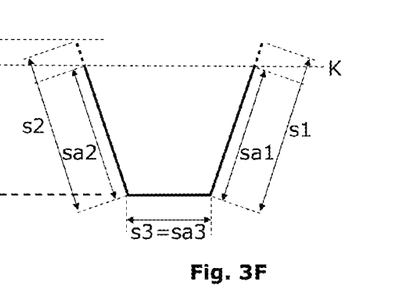
FIG. 3F is a schematic illustration of the cutting edge length and the active cutting edge length of the tool from FIG. 3C.
Figure 3G:
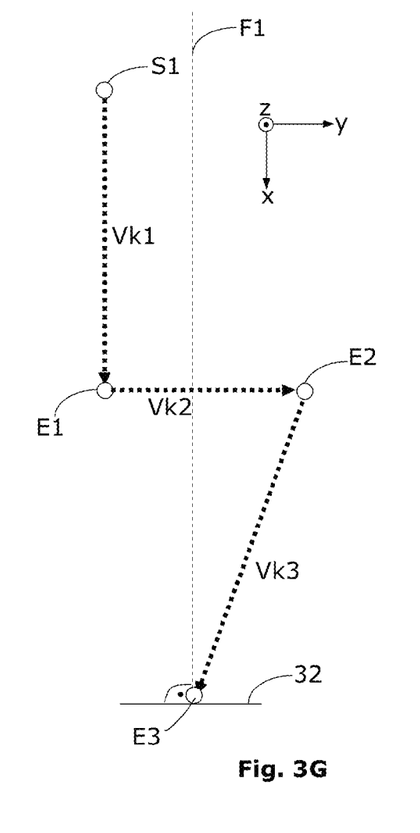
FIG. 3G is a schematic vector projection diagram of the process steps of the invention in enlarged view in a tangential plane whose line of intersection F1 with a work piece cone lateral surface coincides with the perpendicular of the foot cone, where the third indexing step only comprises an obliquely running vector.
Figure 3H:
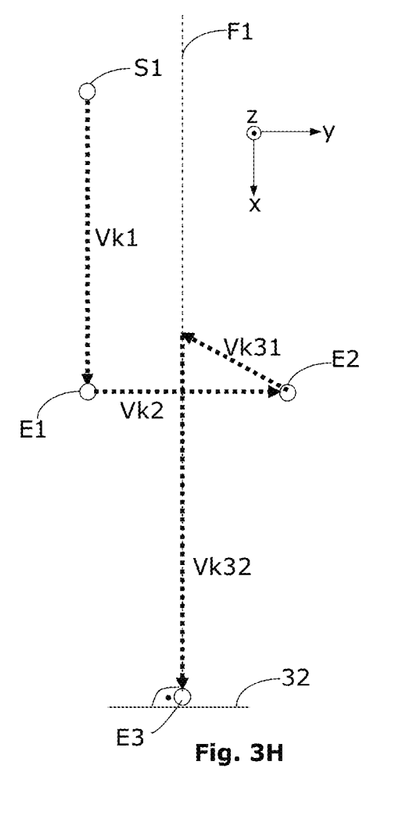
FIG. 3H is a schematic vector projection diagram of alternative process steps of the invention in enlarged view in a tangential plane whose line of intersection F1 with a work piece cone lateral surface coincides with the perpendicular of the foot cone, where the third indexing step only comprises two vectors.
Figure 4A:
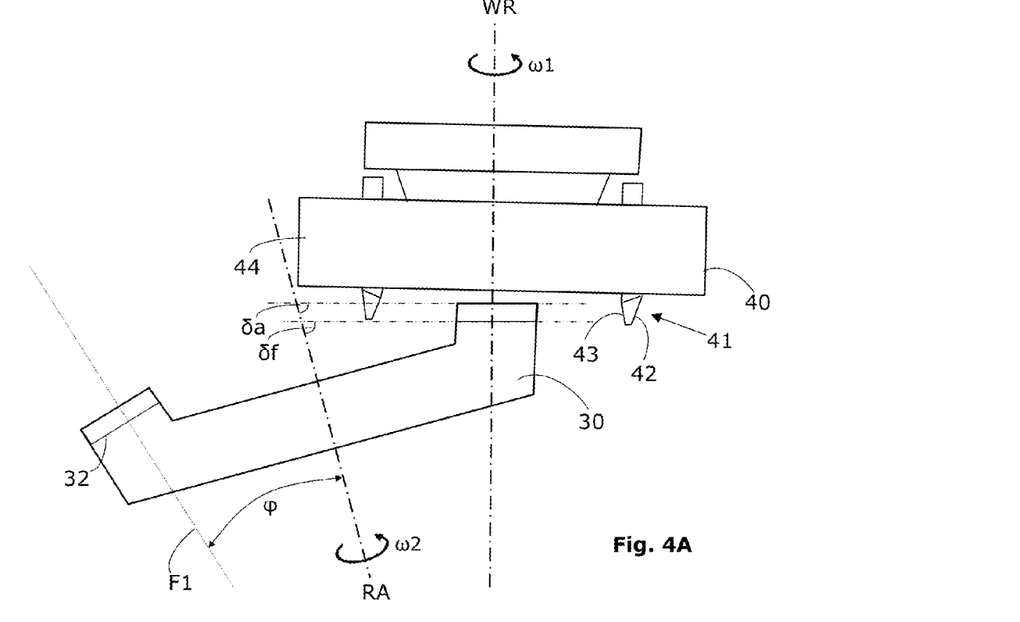
FIG. 4A is a schematic illustration of a cutting head tool in the axial plane of intersection of a ring gear work piece during engagement with the ring gear work piece having constant tooth height.

This is then followed by the execution of a second relative plunging movement along a vector path Vk3 which, projected into the tangential plane, extends obliquely to the perpendicular of the foot cone of the work piece 30 to be machined as shown in FIGS. 3C and 3G or which is composed of two component vectors Vk31 and Vk32, as shown in FIG. 3H. The second relative plunging movement is accomplished in all embodiments by a superposition of one movement parallel to the x axis of the coordinate system shown in FIG. 3C and one movement in the y-z plane of this coordinate system. In all embodiments, the second relative plunging movement has an end point E3, which lies at a position of the work piece 30 which approximately corresponds to the slot depth LT and slot centre of the tooth gap 31 to be fabricated. The second relative plunging movement with only one vector Vk3 is shown in FIG. 3C.

FIGS. 3D, 3E and 3F each show only the cutting edge lengths and the active cutting edge lengths of the indexing steps of FIGS. 3A, 3B and 3C. The total length of the cutting edges SL in the example shown when viewed in simplified form is composed of the indexing edge lengths s1, s2, s3 according to the following addition: SL=s1+s2+s3. The active cutting edge length SKL when viewed in simplified form is obtained from the following addition: SKL=sa1+sa2+sa3.

FIG. 3G shows a schematic vector diagram of the mentioned process (indexing) steps in one plane (similarly to FIGS. 3A, 3B and 3C), where this precisely involves a projection of the vectors Vk1, Vk2 and Vk3 in the plane of the drawing. Not all three vectors Vk1, Vk2, Vk3 or Vk31 and Vk32 must necessarily lie in the same plane.

FIG. 3A shows the two main cutting edges 42 and 43 of the blade or cutter 41. The first main cutting edge 42 is configured for machining the concave tooth flanks and the second main cutting edge 43 is configured for machining the convex tooth flanks of the tooth gap 31. In addition, the blade or the cutter 41 comprises a head cutting edge which is provided in FIG. 2A with the reference number 45.

When executing the first plunging movement (first indexing step) both the first main cutting edge(s) 42, the second main cutting edge(s) 43 and the head cutting edge(s) 45 are used and machine. When executing the first plunging movement however, care is taken to ensure that the tool 40 or the main cutting edges 42, 43 of the tool 40 plunge at most so far that the critical active cutting edge length SKL is not exceeded. The example in FIG. 3A was selected so that the active cutting edge length SA is less than or equal to the critical active cutting edge length SKL and here in this example is about 80% of the total length SL of the main cutting edges 42, 43 and head cutting edge 45. That is, SKL=0.8 SL. During the first indexing step, when executing the first plunging movement only a piece with sa1<s1 of the main cutting edge 43, a piece with sa2<s2 of the main cutting edge 42 and the entire head cutting edge 45 with s3=sa3 are used. Thus, during the first indexing step the active cutting edge length SA is always smaller than the critical active cutting edge length SKL.

In the said first indexing step the tool 40 is guided relative to the work piece 30 so that in the region near the tooth head of the tooth gap 31 the first tooth flank (here the concave tooth flank 24) is brought to the desired dimension along a line. The said line preferably comprises the line of intersection of the work piece cone lateral surface with the desired profile of the first tooth flank 24. An excess of material is still found on the remaining first tooth flank.

Both the dimensions of the individual cutting edges 42, 43, 45 of the first indexing step according to FIG. 3A and also the active cutting edge lengths sa1, sa2, sa3 effective instantaneously in the first indexing step are indicated in FIG. 3D. It holds that SL=s1+s2+s3 and SA=sa1+sa2+sa3, where SA≤SKL<SL.

When executing the relative transverse movement (second indexing step), principally the second main cutting edge(s) 43 perform machining as can be seen in FIG. 3B. In this context it should be mentioned that as a result of the schematic diagrams, the tooth foot 32 is shown as a straight line. In reality the tooth foot 32 in a ring gear is slightly curved in the indexing direction. In some embodiments, no depth feeding takes place in the x direction when executing the relative transverse movement.

In the said second indexing step, the tool 40 is guided relative to the work piece 30 so that in the region near the tooth head of the tooth gap 31 the second tooth flank (here the convex tooth flank 23) is brought to the desired dimension along a line. The said line comprises the line of intersection of the work piece cone lateral surface with the desired profile of the second tooth flank 23. An excess of material is still found on the remaining second tooth flank.

In FIG. 3E both the dimensions of the individual cutting blades 42, 43, 45 of the second indexing step according to FIG. 3B and also the active cutting edge lengths effective instantaneously in the second indexing step sa1, sa2, sa3 are indicated. It holds that SL=s1+s2+s3 and SA=sa1+sa3. The active cutting edge length SA is here significantly shorter than SA in FIG. 3D. Thus the condition that SA≤SKL<SL must be satisfied is also fulfilled here.

Depending on the design the head cutting edge 45 can be completely (i.e., s3=sa3) or only partially (i.e., sa3<s3) used in the second indexing step.

When executing the second relative plunging movement along the vector path Vk3 or the vector paths Vk31 and Vk32 (third indexing step) both the first main cutting edge(s) 42 and the second main cutting edge(s) 43 and the head cutting edge 45 perform machining.

In the said third indexing step the tool 40 is guided relative to the work piece 30 so that both tooth flanks 23, 24 are either machined completely (i.e., brought to the desired dimension) or that only small edges or transitions remain which can be eliminated by re-machining.

In FIG. 3F both the dimensions of the individual cutting blades 42, 43, 45 of the third indexing step according to FIG. 3C and also the active cutting edge lengths effective instantaneously in the third indexing step sa1, sa2, sa3 are indicated schematically and in summary form. It holds that SL=s1+s2+s3 and SA=sa1+sa3. The active cutting edge length SA is here significantly longer than SA in FIG. 3D (sa1 and sa2 in FIG. 3F are somewhat longer than sa1 and sa2 in FIG. 3D). Thus the condition that SA≤SKL<SL is also fulfilled here. It is obvious that particularly in the third indexing step, depending on the design, the active cutting edge length SA varies temporally according to the process guidance.

For all the process steps it holds that the active cutting edge length SA, i.e., the total cutting edge length effective at any moment, is always less than or equal to SKL. That is, it always holds that SA≤SKL<SL.

If in the first indexing step according to FIG. 3A, the plunging would be somewhat deeper than shown, then SA in FIG. 3F would be approximately the same length as SA in FIG. 3D. In this case Vk1 would be shown longer and Vk3 shorter.

FIG. 3H shows an alternative third indexing step. In the alternative third indexing step the vector path Vk3 is composed to two component vectors Vk31 and Vk32 which are indicated in the figure. The first component vector Vk31 runs obliquely backwards in the tooth gap 31 (i.e., out from the tooth gap 31) and is therefore designated as relative return movement. The second component vector Vk32 runs linearly in the direction of the tooth foot 32 of the tooth gap 31 to be fabricated and reaches the same end point E3 as the alternative process shown in FIG. 3G. The end point E3 again lies on the line of intersection F1, i.e., on the perpendicular of the cone foot.

Figure 4B:
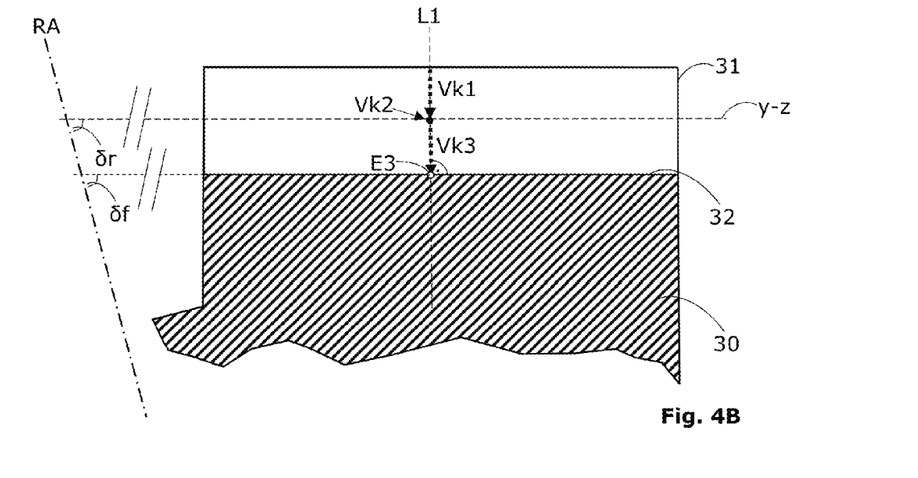
FIG. 4B is a schematic sectional enlargement of the axial plane of intersection of a tooth gap of the ring gear work piece of FIG. 4A.

FIG. 4B shows a schematic, enlarged view of one of the tooth gaps 31 and a section through a part of the work piece 30 according to FIG. 4A. In order to show the three indexing steps described, the corresponding vectors of a simplified process are shown as a projection in the plane of the drawing. The first linear plunge vector Vk1 actually lies behind the plane of the drawing in FIG. 4B and can be seen in the projection as a straight line. The first plunge vector Vk1 runs substantially parallel to the perpendicular L1 of the foot cone which is defined by the foot cone angle δf. In the example shown, the transverse vector Vk2 passes along a straight line (corresponds to the cutting blade radius 54 in FIG. 6) from back to front in the plane of the drawing (or from front to back according to the direction of rotation), runs in the y-z plane (if no x-feeding takes place), which is shown in FIG. 4B by the dashed line of intersection with the plane of the drawing, and in the projection is merely a point shown black. The second plunge vector Vk3 of the vector path lies in the projection shown in the plane of the drawings in the extension of the vector Vk1 and ends at the foot cone (tooth foot 32). The end point E3 lies on the perpendicular L1.

FIGS. 4A and 4B show the application of the invention to a ring gear as work piece 30. The first plunge vector Vk1 runs substantially perpendicularly on the foot cone of the work piece 30 to be machined (i.e. parallel to the perpendicular L1), where the first plunge vector Vk1 encloses an acute angle φ with the work piece axis of rotation RA depending on ring gear 30 and overall arrangement, which, for example, is between −15 and +15 degrees. The angle φ depends on the foot cone angle δf in the end effect.

Figure 5A:
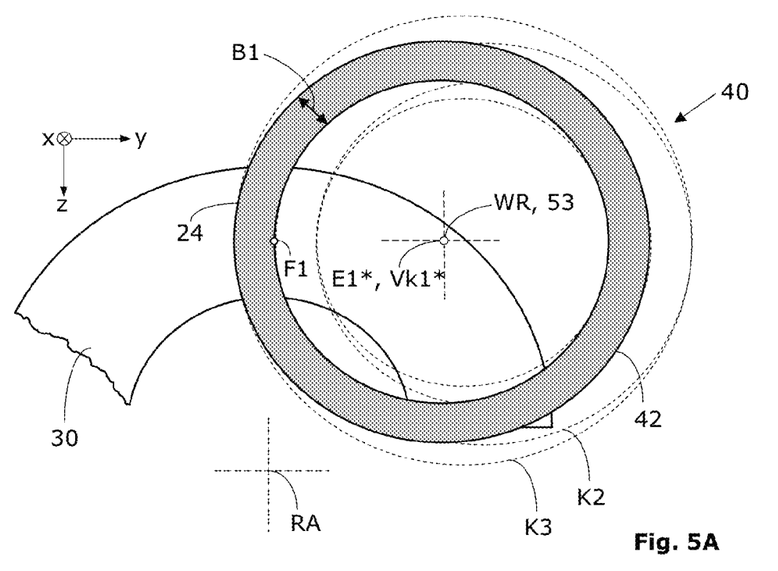
FIG. 5A is a partial schematic plan view of a plane gear of a bevel gear work piece showing A first process step.
Figure 5B:
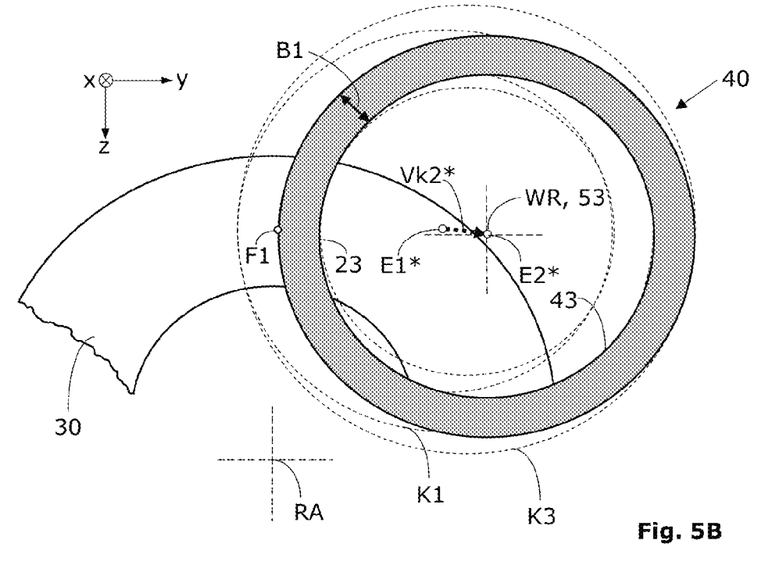
FIG. 5B is a partial schematic plan view of the plane gear of the bevel gear work piece of FIG. 5A showing a second process step.
Figure 5C:
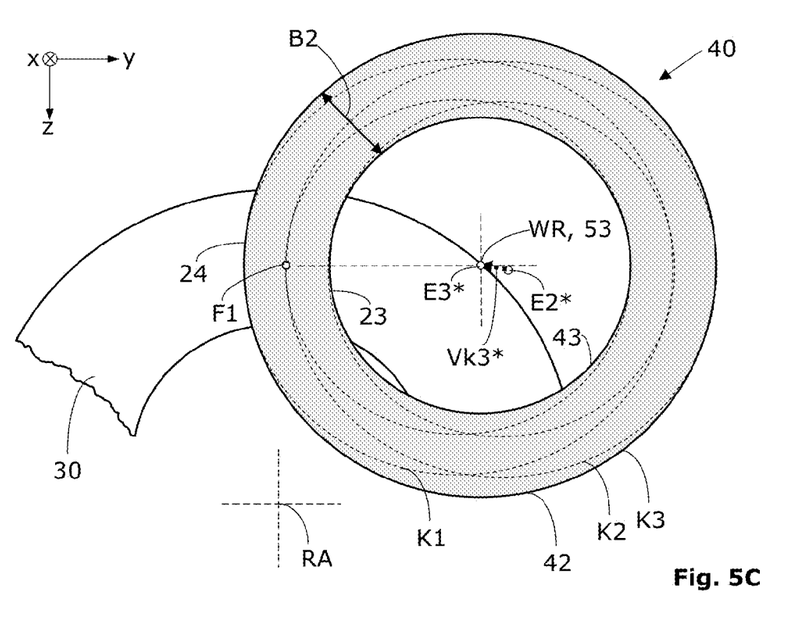
FIG. 5C is a partial schematic plan view of the plane gear of the bevel gear work piece of FIG. 5A showing a third process step.

FIGS. 5A to 5C each show a schematic and highly simplified plan view of a part of a crown gear of a bevel gear work piece 30 to illustrate the first to third process steps. Here a plane gear is intentionally shown to make the diagram easier to view and clearer. The diagrams are highly simplified and therefore, for example, no concealed edges and the like are shown.

FIG. 5A shows a pedant to FIG. 3A. Since the tool 40 is only plunged to the (indexing) plane K, the width of the ring shown grey in the radial direction corresponds approximately to the head width B1 of the head cutting edge 45 (see also FIG. 2A). The large circular ring K3 in FIGS. 5A to 5C is the representation of the concave and convex blade path (flight orbit) of the third indexing step shown in FIG. 5C. The small circular ring K2 in FIGS. 5A and 5C is the representation of the concave and convex blade path (flight orbit) of the second indexing step shown in FIG. 5B and the small circular ring K1 in FIGS. 5B and 5C is the representation of the concave and convex blade path (flight orbit) of the first indexing step shown in FIG. 5A.

At the instant shown in FIG. 5A the tool 40 machines a concave tooth flank 24 of the work piece 30. In FIG. 5A the position of the tool 40 in the second and in the third indexing step is indicated by the dashed circular rings K2 and K3.

In order to better show the vectors Vk2, VK3 graphically, these vectors were placed at the centre point (centre point 53 of the tool/cutter head 40) of the circular rings. The corresponding vectors and points which relate to the position of the centre point 53 and the movements of this centre point 53 are characterized in FIGS. 5A-5C by a "*" in order to be able to distinguish them from the other points and vectors. The end point E1* of the first vector Vk1* is shown in FIG. 5A. In the special case shown, the vector Vk1* runs parallel to the tool axis of rotation WR and therefore coincides with the end point E1* in the plan view. For better illustration the line of intersection F1 is also indicated by a small white circle in FIGS. 5A-5C. This line of intersection F1 coincides as mentioned with the perpendicular on the foot cone. The line of intersection F1 lies in a symmetrical tooth gap 31 centrally between the two flanks 23, 24 and since this comprises a simplified view of the plane gear, perpendicular to the plane of the drawing.

The transverse movement of the second indexing step is shown in FIG. 5B by the transverse vector Vk2*, which starting from the end point E1* leads to the end point E2*. The cutter head centre point 53 moves from E1* to E2* and from E2* to E3* in each case along a straight line. In some embodiments, the points which are contacted at the tooth flanks 23, 24 on reaching the end points E1* and E2* lie on the same pitch circle radius. Since in the second indexing step normally no plunging takes place parallel to the x-axis, the width of the ring shown grey does not vary (the grey ring in FIG. 5A has the same width B1 as the grey ring in FIG. 5B). In the view shown in the y-z plane the ring shown grey is moved along the transverse vector Vk2* further to the right (parallel to the y axis) and downwards (parallel to the z axis) and at the time shown machines a convex tooth flank 23.

Within the framework of the third indexing step whose end point E3* of the movement is shown in FIG. 5C, the tool 40 plunges in a direct or indirect (two-stage) manner more deeply into the material of the work piece 30. In the (indexing) plane K the width B2 of the ring shown light grey in FIG. 5C in the radial direction is significantly greater than the head width B1 of the head cutting edge 45.

The process steps are now explained in more detail by reference to two specific examples, as shown in FIGS. 6 and 7. The tooth gap 31 and the blade or the cutter 41 are asymmetrical in these two cases.

FIG. 6 shows a diagram which at the top left shows a section along the section line K-K through a plane gear 50 with a tooth gap 31 to be fabricated, and on the bottom right shows a sectional view through the indexing plane of the work piece 30 with the tooth gap 31 of the plane gear 50 to be fabricated. The plane gear 50 represents the work piece 30. A single indexing completing process is described by reference to FIG. 6. In addition the corresponding projections of the vectors Vk1, Vk2 and Vk3 are shown in an adjacent diagram (top right), where FIG. 6 is a diagram of the indexing steps of a simplified process. In the region U1 the three different positions E1*, E2* and E3* of the centre point 53 of the work piece 40 are shown.

An asymmetric blade or cutter 41 during execution of the first plunging movement is shown top left in FIG. 6. The movement of the first indexing step is indicated by means of an arrow pointing into the tooth gap 31 at the head cutting edge 45. This arrow is designated as first plunge vector Vk1 in the vector diagram located on the top right. In the diagram shown in FIG. 6 it should be noted that the arrow in the example shown is not set centrally on the head cutting edge 45 but in the transition region between the head cutting edge 45 and the main cutting edge 43. Here it should be noted that a triangle with the sides 51, 52 and 54 is only shown in FIG. 7 for the end point E3 or for the relevant centre point in the position E3*. The side 51 is usually designated as radial or machine distance. For reasons of clarity the corresponding triangles are not indicated for the first and second indexing step. Also it is the case that the cutter head (nominal) radius 54 remains constant in all steps while 52 and/or 51 change. The reference number 54 actually designates a radius to a blade cutting edge, i.e., generally a cutting edge radius.

The first indexing step is followed by a transverse movement along the transverse vector Vk2. In FIG. 6 within the framework of this second indexing step the transverse movement is executed as a linear movement along the cutting edge radius 54 (cutter head (nominal) radius). That is, the points E1*, E2* and E* all lie on a straight line. A plunging along the vector Vk3 then follows as a further indexing step. In the simplified embodiment shown all three vectors Vk1, Vk2 and Vk3 lie in a common plane whose passage through the plane of the drawing (line of intersection with the plane of the drawing) can be identified in the region U1 in FIG. 6.

In the simplified process which is shown in FIG. 6, the contact points of the cutting edges 42, 43 of the tool 40 and the material of the work piece 30 (shown here by a plane gear 50) do not lie at the optimal point. The design of the simplified process is accomplished here by placing a normal on the flank longitudinal line of the concave flank so that it intersections the central pitch circle (here KB) in the centre of the tooth gap width. Instead of also placing the end points E1, E2 on the circular arc KB (i.e. on the central pitch circle with radius 52) in the design, these two end points E1, E2 lie on the mentioned cutting edge radius 54 (cutter head (nominal) radius).

FIG. 7 shows another approach of the invention. In the design of the process according to FIG. 7 the contact points of the cutting edges 42, 43 of the tool 40 and the material of the work piece 30 are placed so that in the region of a line only a little or no excess remains compared to the desired dimension of the flanks 23, 24. In the approach shown in FIG. 7, this line lies in the region designated by I on the flank 24 of the plane gear 50 and runs from tooth head to tooth foot. When executing the transverse movement, the center point 53 of the cutter head 40 follows a straight line as far as a contact point of the other flank 23. The corresponding region is designated by II. Here also in the region of a line only a little or no excess remains compared to the desired dimension of the flank 23. This is only then followed by the third indexing step by a movement along the vector Vk3. The difference from FIG. 6 is that the "division" of the excess in the slot width direction in FIG. 7 is much more uniform since the "line without excess" on both flanks 23, 24 lies approximately at the tooth center. In FIG. 6 they are shifted in each case to the toe or the heel which brings a larger residual excess at one of the two "tooth ends".

On the outside right in FIG. 7 the corresponding arrangement of the three points E1*, E2* and E3* is shown in a sectional enlargement in the region U2. The corresponding vector diagram is shown on the left next to the sectional enlargement U2. FIG. 4A shows a schematic illustration of a cutter head tool 40 in the work piece axial section upon engagement in a ring gear work piece 30. The ring gear work piece 30 here has a constant tooth height, i.e., the head cone angle δa and the foot cone angle δf are the same in the special case shown here. The cutter head tool 40 is fitted with several blades 41 of which in the view shown only two blades 41 spaced apart by 180 degrees in relation to the main body 44 are shown. In this case the blades 41 shown do not have a symmetrical profile. The first cutting edge 42 and the second cutting edge 43 (also called main cutting edges) are designated on one of the two blades 41. When the tool 40 is driven rotationally about the tool axis of rotation WR, as designated by the rotation arrow ω1, the inwardly pointing second main cutting edges 43 intersect the convex tooth flanks 23 of the tooth gaps 31 and the outwardly pointing first main cutting edges 42 intersect the concave tooth flanks 24.

The processing machine is designed and the work piece 30 is clamped in the processing machine so that the work piece 30 can be rotationally driven about the work piece axis of rotation RA as designated by the rotation arrow ω2.

When executing the first relative linear plunging movement (see, for example, FIG. 3A) along the first plunge vector Vk1, both main cutting edges 42, 43 and the head cutting edge 45 of the blade or cutter 41 of the tool 40 are more or less uniformly loaded since the pressure angles which occur are more or less the same. In addition, especially in this phase as also in the third indexing step, care is taken to ensure that the active cutting edge length SA on the tool 40 does not exceed the critical active cutting edge length SKL. During the transverse movement (see, for example, FIG. 3B), principally only the cutting edge 43 and a more or less large part of the head cutting edge 45 are loaded. Since normally no plunging movement (i.e., no deeper plunging parallel to the x axis of the coordinate system) takes place here, the active cutting edge length SA on the tool 40 by no means exceeds the critical active cutting edge length SKL. Also during the third indexing step (see, for example, FIG. 3C), particular care should be paid to ensure that the active cutting edge length SA on the tool 40 does not exceed the critical active cutting edge length SKL.

In the example shown in FIGS. 3A to 3C the length of the plunge vector Vk3 is greater than the length of the plunge vector Vk1. That is, when executing the third indexing step the active cutting edge length SA is somewhat greater than in the first indexing step. If the vector path of the third indexing step is composed of two component vectors Vk31 and Vk32, as shown in FIG. 3H, the third component vector Vk32 is even significantly longer than the plunge vector Vk1.

In some embodiments, the process sequence and the NC-controlled relative movements in the processing machine are configured such that the active cutting edge length SA in the first indexing step approximately corresponds to the active cutting edge length SA of the third indexing step, or the third component vector Vk32 of the third indexing step.

The end point E1 of the first plunging movement, in some embodiments, lies at a position of the work piece 30 which is between 10% and 60%, such as between 40% and 60%, of the slot depth LT of the tooth gap 31 to be fabricated (when viewed in the direction of the normal L1 to the foot cone angle). The end point E1 is selected here so that as uniform as possible division of cutting between the three indexing steps and loading of the tool 40 is achieved.

In some embodiments, the transverse vector Vk2 runs along a straight line so that starting from the end point E1 of the first vector Vk1 lying in the y-z plane (if there is no x feeding), it runs towards the second tooth flank 23 of the tooth gap 31 to be fabricated.

Movement of the first indexing step can be achieved by a linear (carriage) movement of the tool 40 in the direction of the work piece 30. The movement of the second indexing step can be produced by a superposition of two linear (carriage) movements of the tool 40 in the y-z plane. The movement(s) of the third indexing step can be produced by a superposition of three linear (carriage) movements of the tool 40 in the direction of the work piece 30.

The process is used on an NC-controlled processing machine. The NC-controlled movements of the processing machine can be executed such that the profile section of the second tooth flank 23, in which the same final profile is produced as on the first tooth flank 24 lies on the same cone length (i.e., on the same work piece cone envelope), as the first tooth flank 24. The process described with reference to FIG. 7 fulfils this requirement. The corresponding pitch cone length (or the corresponding plane gear radius) is designated with the reference number 52 in FIG. 7.

In some embodiments, the execution of the first plunging movement, the transverse movement and the second plunging movement is following by re-machining. This applies particularly when in the preceding first to third indexing steps the tooth flanks 23, 24 have not been completely machined. During re-machining the work piece 30 is rotated slightly in the positive or negative direction of rotation (called β+ and β– finishing movements) about the work piece axis of rotation RA while the tool 40 is rotationally driven further about the tool axis of rotation WR. This form of re-machining can remove edges and transitions which can be obtained as a result of the process according to an aspect of the invention on the surface of the tooth flanks 23, 24. In addition an excess can be removed which has intentionally been left standing on the tooth flanks 23, 24.

In the continuous process this "additional" rotation of the work piece 30 (in addition to the indexing rotation) which takes place in the course of the mentioned optional re-machining has effects on the cutter head rotation via the coupling to the cutter head.

After finishing a tooth gap, the tool 40 is retracted (when viewed relatively) and the work piece 30 is gradually rotated further (called indexing rotation) when this involves a single indexing process.

In order to make the wear of the main cutting edges 43, 44 of the tool 40 more uniform, the machining of the concave tooth flanks 24 can take place once with the main cutting edge 42 and the machining of the convex tooth flanks 23 can take place once with the main cutting edge 43. This approach is described as alternating multi-stage plunging process. In the single indexing process this alternating can take place between the individual successively machined slots of the bevel gear work piece whereas in the continuous indexing process it takes place between successively machined bevel gear work pieces.

The invention can be applied not only to symmetrical but also to asymmetric tooth gaps where in this case the profile of the cutter or blade 41 either is accordingly asymmetrical or the tool 40 has symmetrical cutters or blades 41 and is produced by a slanting position of asymmetrical tooth gaps.

As may be recognized by those of ordinary skill in the pertinent art based on the teachings herein, numerous changes and modifications can be made to the above-described and other embodiments of the present invention without departing from the scope of the invention as defined in the appended claims. Accordingly, this detailed description of embodiments is to be taken in an illustrative, as opposed to a limiting sense.

What is claimed is:

1. A method of chip-removal machining of at least one tooth gap of a bevel gear or hypoid gear work piece comprising rotating a cutting tool having a first main cutting edge and a second main cutting edge about an axis of rotation of the cutting tool, and performing the following steps during said rotating step:
   (a) moving the cutting tool in a first relative linear plunging direction along a first plunge vector that extends substantially perpendicularly to a foot cone of the work piece, to a position in the work piece that is more than 10% of a slot depth of the tooth gap to be fabricated, thereby machining with the first main cutting edge a region of the work piece near a tooth head of a first tooth flank of the tooth gap;
   (b) moving the cutting tool relatively transversely along a transverse vector so as to move the second main cutting edge in a direction of a second tooth flank of the tooth gap, and machine a region of the work piece near a tooth head of the second tooth flank of the tooth gap; and
   (c) moving the cutting tool in a second plunging movement along a vector path to a position in the work piece approximately corresponding to the slot depth of the tooth gap to be fabricated.

2. A method as defined in claim 1, wherein the first plunge vector is defined by a linear feed movement.

3. A method as defined in claim 1, wherein the transverse vector defines a linear movement that runs parallel to a cutter head radius of the cutting tool.

4. A method as defined in claim 1, wherein the work piece comprises a ring gear defining an axis of rotation, and the first plunge vector defines an acute angle φ relative to the work piece axis of rotation within the range of −15° to +15°.

5. A method as defined in claim 1, wherein step (a) includes moving the tool to a position in the work piece that is at least 40% of the slot depth of the tooth gap to be fabricated.

6. A method as defined in claim 1, wherein the vector path is defined by (i) a single vector obliquely extending in a direction toward a tooth foot of the tooth gap to be fabricated, or (ii) two component vectors, wherein a first of said two component vectors is defined by an obliquely-extending withdrawal movement of the cutting tool from the tooth gap, and a second of said two component vectors is defined by a vector extending linearly in a direction toward the tooth foot of the tooth gap to be fabricated.

7. A method as defined in claim 1, wherein the cutting tool comprises a plurality of said first main cutting edge configured for machining concave tooth flanks, a plurality of said second main cutting edge configured for machining convex tooth flanks and head cutting edges, and wherein step (a) includes machining with the first main cutting edges, the second main cutting edges, and the head cutting edges.

8. A method as defined in claim 7, wherein step (b) includes machining with the second main cutting edges.

9. A method as defined in claim 8, wherein step (b) further comprises machining with the head cutting edges.

10. A method as defined in claim 7, wherein step (a) includes producing a first line of the final flank profile, and step (b) includes producing a second line of the final flank profile, wherein the first line and the second line of the final flank profile lie on a cone lateral surface of the work piece.

11. A method as defined in claim 1, further comprising rotating the work piece about an axis of rotation of the work piece while rotating the cutting tool about its axis of rotation, thereby re-machining the work piece.

12. A method as defined in claim 1 defining (i) an indexing process with intermittent indexing rotations or (ii) a continuous process.

* * * * *